United States Patent
Asada

(10) Patent No.: US 7,905,811 B2
(45) Date of Patent: Mar. 15, 2011

(54) SPEED CHANGING STRUCTURE FOR WORK VEHICLE

(75) Inventor: Akihiro Asada, Kawachinagano (JP)

(73) Assignee: Kubota Corporation, Osaka (JP)

(*) Notice: Subject to any disclaimer, the term of this patent is extended or adjusted under 35 U.S.C. 154(b) by 416 days.

(21) Appl. No.: 11/726,385

(22) Filed: Mar. 21, 2007

(65) Prior Publication Data
US 2007/0266812 A1    Nov. 22, 2007

(30) Foreign Application Priority Data
May 17, 2006   (JP) .................................. 2006-137812

(51) Int. Cl.
  *B60W 10/04*   (2006.01)
  *B60K 20/00*   (2006.01)
(52) U.S. Cl. .......................... 477/34; 74/473.1; 74/473.3
(58) Field of Classification Search .................... 477/34, 477/902; 74/473.1, 473.12, 473.13, 473.3, 74/335
See application file for complete search history.

(56) References Cited

U.S. PATENT DOCUMENTS

| | | | | |
|---|---|---|---|---|
| 4,913,004 A | * | 4/1990 | Panoushek et al. | 477/155 |
| 5,741,202 A | * | 4/1998 | Huber | 477/124 |
| 5,943,912 A | * | 8/1999 | Fowler et al. | 74/335 |
| 6,065,560 A | * | 5/2000 | Palmeri et al. | 180/326 |
| 6,224,511 B1 | * | 5/2001 | Steeby | 477/111 |
| 6,336,372 B1 | * | 1/2002 | Ogami et al. | 74/335 |
| 2003/0226416 A1 | * | 12/2003 | Umemoto et al. | 74/335 |

FOREIGN PATENT DOCUMENTS

| | | | |
|---|---|---|---|
| EP | 1146258 A1 | * | 10/2001 |
| JP | 2003-343712 A | | 12/2003 |
| JP | 2005-226726 A | | 8/2005 |
| KR | 100373033 B1 | | 4/2002 |

* cited by examiner

*Primary Examiner* — Roger Pang
(74) *Attorney, Agent, or Firm* — The Webb Law Firm

(57) ABSTRACT

A speed changing structure for a work vehicle, comprising a travel speed changing device having a plurality of speed change positions, a manually operated speed changing lever (63), control means (64) for controlling the travel speed changing device, and a manually operable operating part (65) provided to the speed changing lever (63), wherein the control means (64) has a first speed changing mode for operating the travel speed changing device in single steps so as to follow the operation of the speed changing lever (63), and a second speed changing mode for operating the travel speed changing device without passing through intermediate speed change positions to a speed change position that corresponds to the operating position after the speed changing lever (63) has been moved from the speed change position that corresponds to the operating position prior to the speed changing lever (63) being operated; and the control means (64) operates the travel speed changing device in the first speed changing mode when the operating part (65) is not operated and the speed changing lever (63) is operated, and operates the travel speed changing device in the second speed changing mode when the operating part (65) is operated and the speed changing lever is operated.

7 Claims, 9 Drawing Sheets

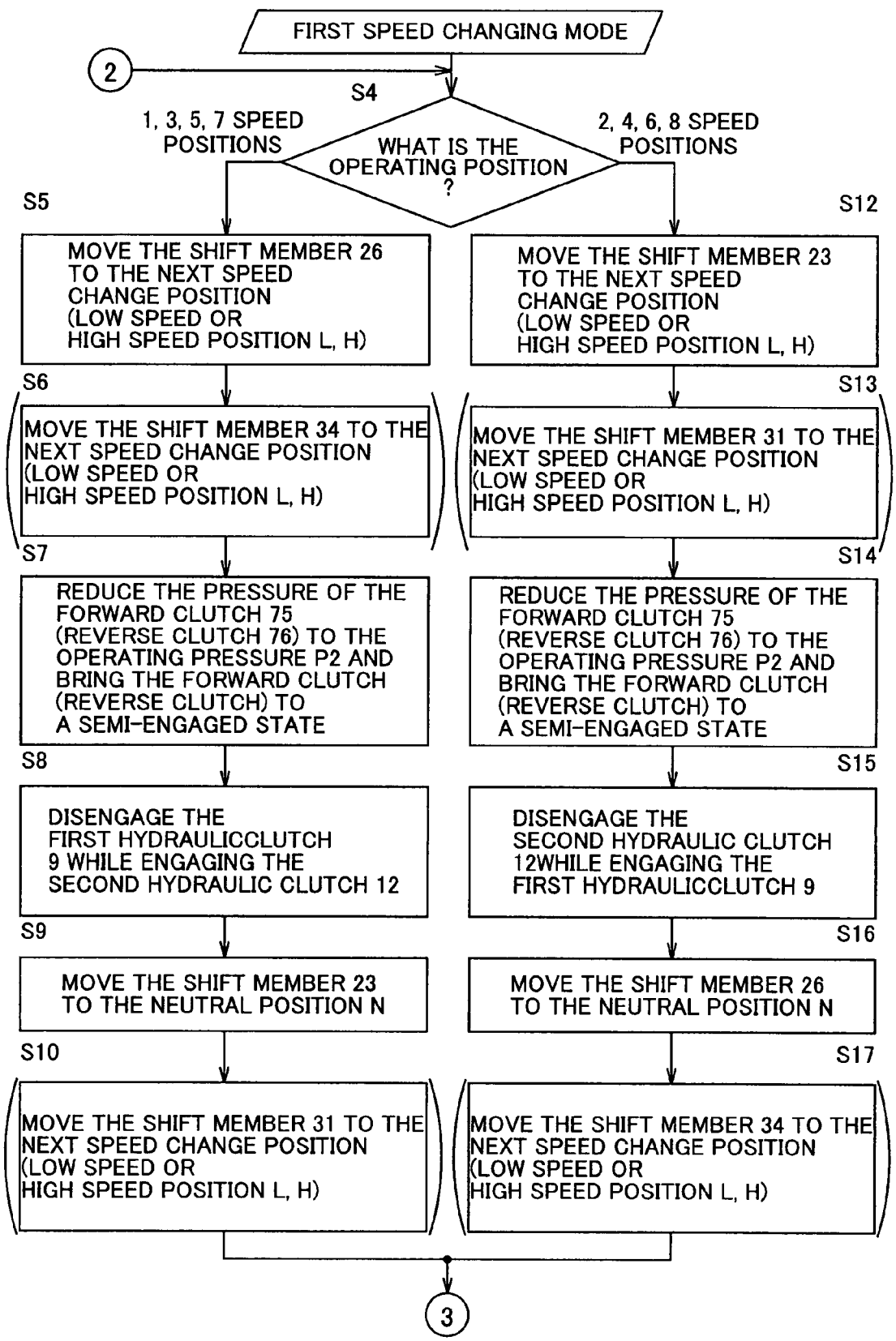

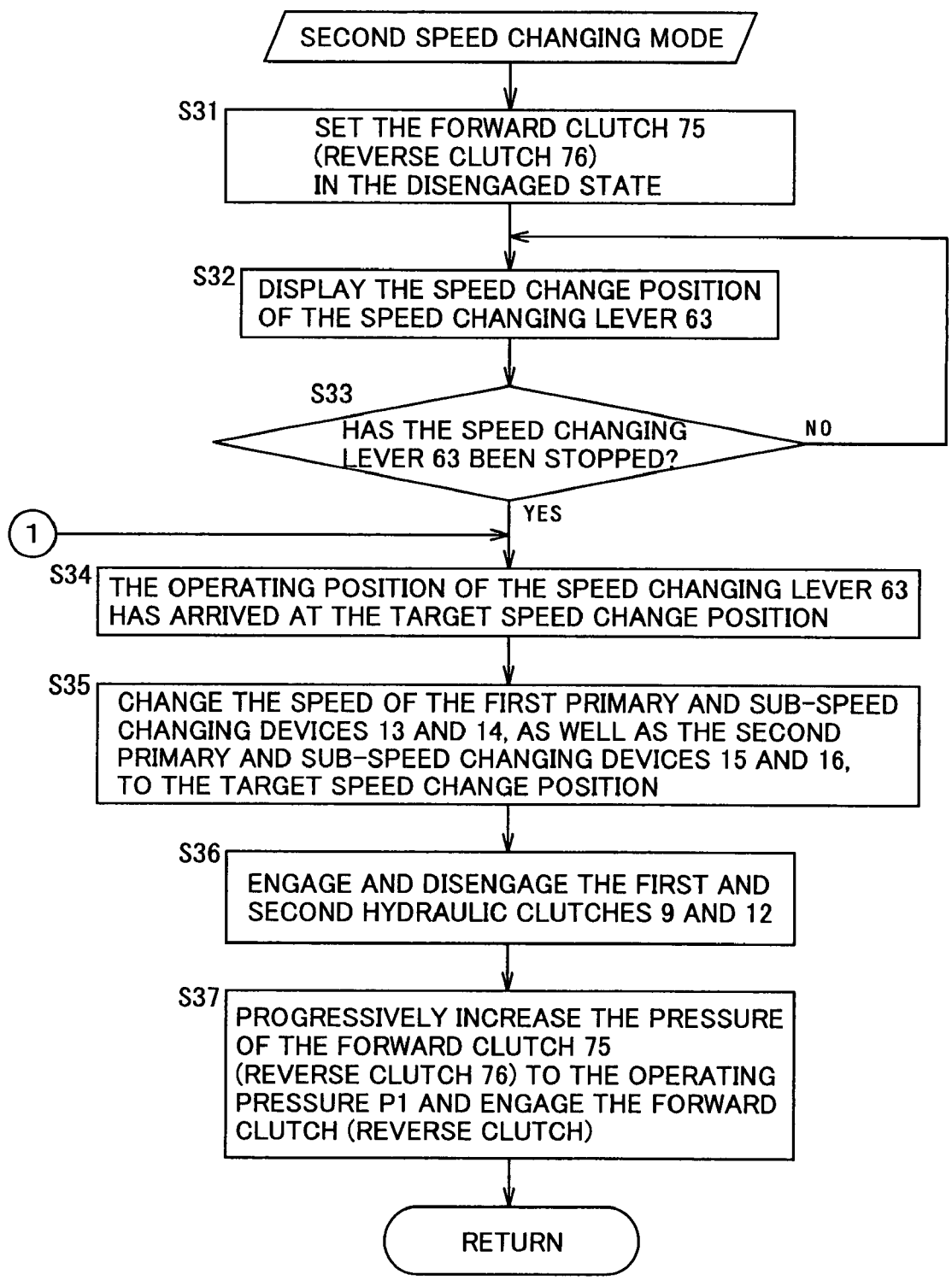

Fig.8

| | FIRST PRIMARY SPEED CHANGING DEVICE 13 FIRST SUB-SPEED CHANGING DEVICE 14 | | | SECOND PRIMARY SPEED CHANGING DEVICE 15 FIRST SUB-SPEED CHANGING DEVICE 16 | | |
|---|---|---|---|---|---|---|
| | SHIFT MEMBER 23 | SHIFT MEMBER 31 | FIRST HYDRAULIC CLUTCH 9 | SHIFT MEMBER 26 | SHIFT MEMBER 34 | SECOND HYDRAULIC CLUTCH 12 |
| FIRST SPEED POSITION | L | L | ENGAGED | N | L | DISENGAGED |
| SECOND SPEED POSITION | N | L | DISENGAGED | L | L | ENGAGED |
| THIRD SPEED POSITION | H | L | ENGAGED | N | L | DISENGAGED |
| FOURTH SPEED POSITION | N | L | DISENGAGED | H | L | ENGAGED |
| FIFTH SPEED POSITION | L | H | ENGAGED | N | H | DISENGAGED |
| SIXTH SPEED POSITION | N | H | DISENGAGED | L | H | ENGAGED |
| SEVENTH SPEED POSITION | H | H | ENGAGED | N | H | DISENGAGED |
| EIGHTH SPEED POSITION | N | H | DISENGAGED | H | H | ENGAGED |

SPEED CHANGING STRUCTURE FOR WORK VEHICLE

BACKGROUND OF THE INVENTION

1. Field of the Invention

The present invention relates to a speed changing structure for a work vehicle.

2. Description of the Related Art

In conventional structures in agricultural tractors and other work vehicles, a travel speed changing device having a plurality of speed change positions is provided, and a manually operated speed changing lever and a travel speed changing device are mechanically linked by a linkage or the like. The travel speed changing device is not directly operated by the speed changing lever, but is configured so that control means operates the travel speed changing device on the basis of the operation of the speed changing lever by electrically detecting the operation position of the speed changing lever (e.g., see JP-A 2005-226726 and JP-A 2003-343712).

In JP-A 2005-226726, a hydraulic clutch-form speed changing apparatus (10 and 11 in FIG. 1) is provided in which a plurality of hydraulic clutches are combined, and also provided are control valves (31a, 32a, 33a, 34a, 38, and 39 in FIGS. 2 and 3) for controlling the travel speed changing device, a controller (see FIG. 2) for controlling the control valves, and a pushbutton-form shift-up button and shift-down button (61 and 62 in FIG. 2). The control valve is thereby operated by the controller each time the shift-up button and the shift-down button are pressed/operated, and the travel speed changing device is operated by the control valves toward the high speed side and the low speed side in single steps.

In JP-A 2003-343712, a synchromesh-form travel speed changing device (13, 14, 15, and 16 in FIG. 1) is provided together with a plurality of hydraulic cylinder-form actuators (35, 36, 37, and 38 in FIGS. 1 and 2) for operating the travel speed changing device, a controller (64 in FIG. 2) for controlling the actuators, and a speed changing lever (63 in FIG. 2). The actuators are thereby operated by the controller via operation of the speed changing lever, and the travel speed changing device is operated by the actuator in single steps.

In JP-A 2003-343712, in addition to a mode (see paragraph [0051]) that operates the travel speed changing device in single steps as described above, there is also a mode (see paragraph [0044]) in which the travel speed changing device is moved from a speed change position that corresponds to the operating position occupied prior to the movement of the speed changing lever to a speed change position that corresponds to the operating position occupied following the movement of the speed changing lever. The mode for operating the travel speed changing device in single steps and the mode for operating the travel speed changing device without passing though intermediate speed change positions are selected using a setting switch (65 in FIG. 2).

In JP-A 2003-343712, the change in running speed of the machine is relatively small when the travel speed changing device is operated by a single step from a current speed change position to the high speed side or the low speed side in the mode for operating the travel speed changing device in single steps. Therefore, the generated shock of the speed change is relatively low even if the travel speed changing device is repeatedly operated in single steps (consequently, some time is required for the travel speed changing device to reach the target speed change position).

In contrast, in JP-A 2003-343712, when the speed changing lever is moved to an operating position considerably separated from the current operating position (e.g., from first speed position to sixth speed position) in the mode for operating the travel speed changing device without passing through intermediate speed change positions, the travel speed changing device is operated without passing through the intermediate speed change positions, i.e., from the first speed position to the sixth speed position. Therefore, the change in speed of the machine is increased, and a relatively large speed change shock is generated (consequently, the travel speed changing device will reach the target speed change position in a short period of time).

In JP-A 2003-343712, a setting switch that is different from the speed changing lever is used to select the mode for operating the travel speed changing device in single steps and to select the mode for operating the travel speed changing device without passing through intermediate speed change positions. Therefore, after one of the modes has been selected using the setting switch, the operator may forget which mode was selected using the setting switch when the speed changing lever is operated after a short period of time has elapsed.

When, for example, the mode for operating the travel speed changing device without passing through intermediate speed change positions has been selected, but the driver mistakenly believes that the mode for operating the travel speed changing device in single steps has been selected, the driver may operate the speed changing lever to an operating position that is considerably far away from the current operating position, whereupon a relatively large speed change shock is generated as described above in conjunction with the operation of the travel speed changing device even though the mode for operating the travel speed changing device in single steps has been selected (and the driver may believe the generated speed change shock to be relatively small), and the driver may experience discomfort in such an unexpected situation.

An object of the present invention is to provide a speed changing structure for a work vehicle comprising a travel speed changing device that has a plurality of speed change positions, wherein the state in which the driver experiences discomfort in an unexpected situation is reduced in the mode for operating the travel speed changing device without passing through intermediate speed change positions in cases in which the apparatus can operate in a mode for operating the travel speed changing device in single steps and a mode for operating the travel speed changing device without passing through intermediate speed change positions.

SUMMARY OF THE INVENTION

According to a first aspect of the present invention, there is provided a speed changing structure comprising:

a travel speed changing device having a plurality of speed change positions;

a manually operated speed changing lever;

control means for controlling the travel speed changing device; and a manually operable operating part provided to the speed changing lever, wherein the control means has a first speed changing mode for operating the travel speed changing device in single steps so as to follow the operation of the speed changing lever, and a second speed changing mode for operating the travel speed changing device without passing through intermediate speed change positions to a speed change position that corresponds to the operating position after the speed changing lever has been moved from the speed change position that corresponds to the operating position prior to the speed changing lever being operated; and the control means operates the travel speed changing device in the first speed changing mode when the operating part is not operated and the speed changing lever is operated, and operates the travel speed changing device in the second speed changing mode when both the operating part and the speed changing lever are operated.

In accordance with the configuration described above, a speed changing lever is provided, a manually operable operating part is provided to the speed changing lever, and when the speed changing lever, but not the operating part, is operated, the travel speed changing device is operated in the first speed changing mode for operating the travel speed changing device in single steps, and the shock of the speed change generated in the first speed changing mode is made relatively low (consequently, some time is required for the travel speed changing device to reach the target speed change position).

When both the operating part and the speed changing lever are operated, the travel speed changing device is operated in the second speed changing mode for operating the travel speed changing device without passing through intermediate speed change positions, and a relatively large speed change shock is generated in the second speed changing mode (consequently, the travel speed changing device will reach the target speed change position in a short period of time).

In situations in which the driver operates the speed changing lever, the speed changing lever is often operated without the operating part in ordinary speed changing conditions in which the driver is not paying particular attention, and as long as the driver is not paying attention to operating the operating part, the driver will rarely operate the operating part and the speed changing lever. Therefore, the speed change shock can be prevented from becoming relatively large even when the speed change is performed unexpectedly in the second speed changing mode and the driver is not aware of the situation.

On the other hand, when the driver operates the speed changing lever in a state in which it is the driver's intention to operate the travel speed changing device so as to reach a target speed change position in a short period of time, the driver often operates the operating part and the speed changing lever based on the intention to operate the travel speed changing device so as to reach a target speed change position in a short period of time, and is often aware that the speed change shock will be relatively large. Therefore, a situation such as when the driver feels the shock to be unexpected can be avoided even when the generated speed change shock is relatively large, because the driver is aware in advance that the generated speed change will be relatively large in the second speed changing mode.

When a speed changing lever and an operating part are provided in separate positions, the driver may operate the operating part using, e.g., the right hand, then release his hand from the operating part, and operate the speed changing lever using the right hand.

In accordance with the above, an operating part is provided to the speed changing lever and the driver can operate the operating part using the hand that holds the speed changing lever. Therefore, there is no need to remove the hand from the speed changing lever to operate the operating part.

As a result of the above, a situation such as when the driver feels the shock to be unexpected can be avoided, discomfort to the driver can be reduced, and the smoothness of the ride can be improved, even when the generated speed change shock is relatively large in the second speed changing mode. This applies to cases in which a first speed operating mode for operating the travel speed changing device in single steps and a second speed changing mode for operating the travel speed changing device without passing through intermediate speed change positions are provided to a speed changing structure for a work vehicle comprising a travel speed changing device that has a plurality of speed change positions.

In ordinary speed changing situations in which the driver is not paying particular attention, the sense of control over the speed changing operation can be improved because the configuration is set so that first speed changing mode for operating the travel speed changing device in single steps is set. In a speed changing state in which the driver knowingly attempts to operate the travel speed changing device so as to reach a target speed change position in a short period of time, the speed changing state (first and second speed changing modes) that matches the driver's operation perception can be obtained by setting the configuration so that the second speed changing mode for operating the travel speed changing device without passing though intermediate speed change positions is set.

In the configuration described above, it preferred that the operating part is protrudably and retractably disposed in the speed changing lever and is urged toward the protruding side; and the control means operates the travel speed changing device in the first speed changing mode when the speed changing lever is operated in a state in which the operating part is protruding, and operates the travel speed changing device in the second speed changing mode when the speed changing lever is operated in a state in which the operating part has been retracted.

In accordance with this configuration, the operating part is urged to the protruding side. Therefore, the operating part can be prevented from being operated (i.e., the operating part retracts) even if the driver unexpectedly makes contact with the operating part when operating the speed changing lever. As a result, speed changing in the second speed changing mode against the wishes of the driver can be further reliably prevented.

In the configuration described above, it preferred that the operating part be disposed on the upper end of the gripping part of the speed changing lever.

In accordance with this configuration, the thumb is positioned in the vicinity of the operating part when the driver grips the speed changing lever. For this reason, reliability can be improved when the operating part is operated because the operating part can be operated by the thumb of the hand that grips the speed changing lever.

BRIEF DESCRIPTION OF THE DRAWINGS

FIG. 6A and FIG. 6B are diagrams showing the flow of the first speed changing mode;

FIG. 7 is a diagram showing the flow of the second speed changing mode; and

FIG. 8 is a chart showing the state of the shift members and the first and second hydraulic clutches in the first to eighth speed positions.

DESCRIPTION OF THE PREFERRED EMBODIMENTS

Figure 1:
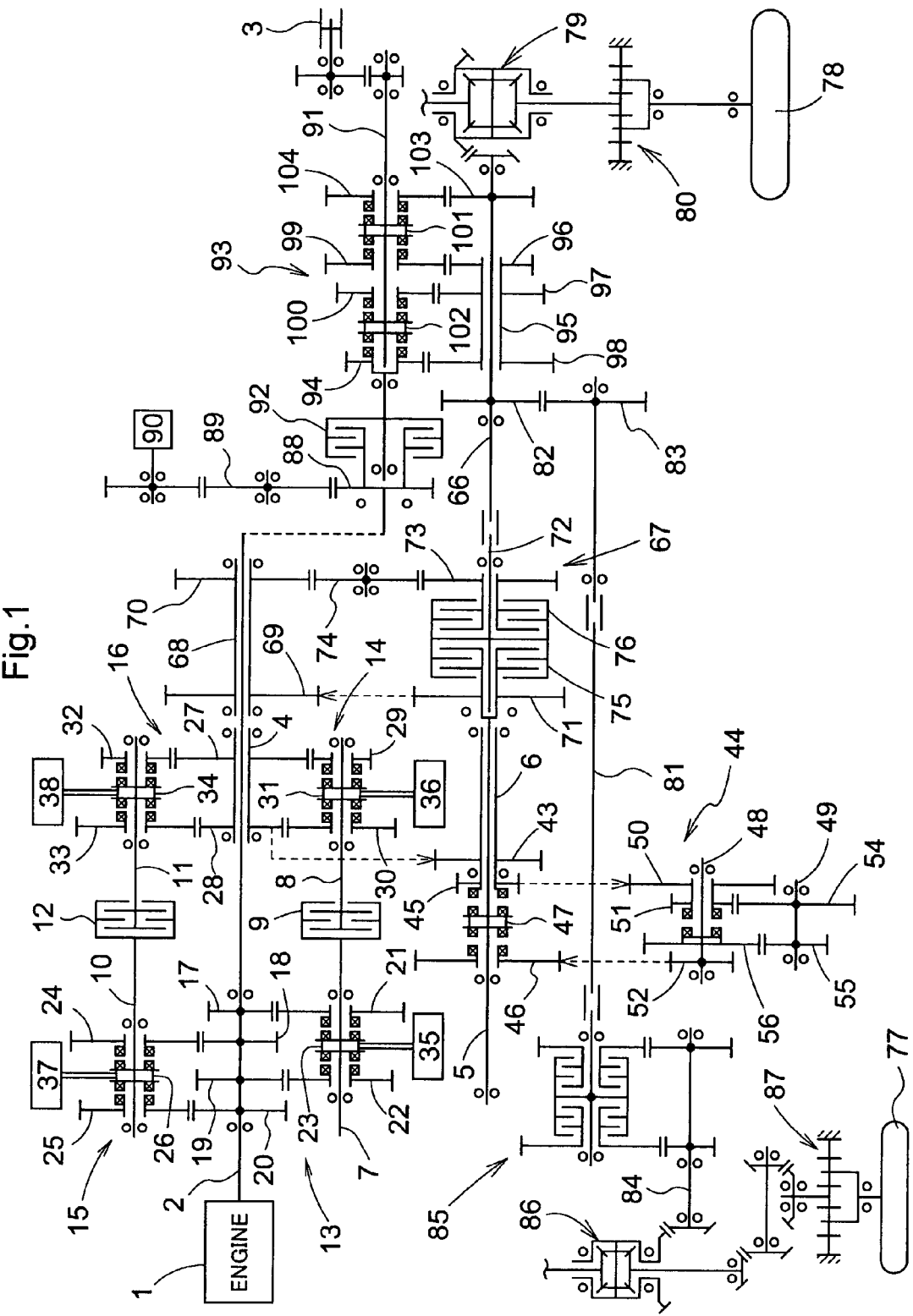
FIG. 1 is a schematic diagram showing a transmission system.

FIG. 1 shows a transmission system of a four wheel drive agriculture tractor as an example of a work vehicle. Described first are a first primary speed changing device 13 (corresponding to a travel speed changing device), a second primary speed changing device 15 (corresponding to a travel speed changing device), a first sub-transmission device 14 (corresponding to a travel speed changing device), and a second sub-transmission device 16 (corresponding to a travel speed changing device).

As shown in FIG. 1, the motive force of the engine 1 is transmitted to the transmission shaft 2 and to the PTO shaft 3 as described in below. A cylindrical transmission shaft 4 is externally fitted onto the transmission shaft 2 so that the two shafts can rotate relative to each other, a first primary transmission shaft 7 and a first sub-transmission shaft 8 are disposed parallel to the transmission shafts 2 and 4, and a first hydraulic clutch 9 is provided between the first primary and sub-transmission shafts 7 and 8. A second primary transmission shaft 10 and a second sub-transmission shaft 11 are disposed parallel to the transmission shafts 2 and 4, and a second hydraulic clutch 12 is provided between the second primary and sub-transmission shafts 10 and 11. The first and second hydraulic clutches 9 and 12 are hydraulic multi-disc frictional clutches, are engaged by being supplied with hydraulic fluid, and are disengaged by discharging the hydraulic fluid.

A synchromesh-form first primary speed changing device 13 is provided between the transmission shaft 2 and first primary transmission shaft 7, and a synchromesh-form second primary speed changing device 15 is provided between the transmission shaft 2 and second primary transmission shaft 10, as shown in FIG. 1. A first gear 17, second gear 18, third gear 19, and fourth gear 20 are fixed to the transmission shaft 2. A low speed gear 21 and a high speed gear 22 externally fitted onto the first primary transmission shaft 7 so as to be able to rotate relative to each other mesh with the first gear 17 and third gear 19. A shift member 23 is externally fitted onto the first primary transmission shaft 7 by using a spline structure so that the member and the shaft can rotate and slide in integral fashion, thereby constituting the first primary speed changing device 13. A low speed gear 24 and a high speed gear 25 externally fitted onto the second primary transmission shaft 10 so as to be able to rotate in relation to the shaft mesh with the second gear 18 and fourth gear 20. A shift member 26 is externally fitted onto the second primary transmission shaft 10 by using a spline structure so that the member and the shaft can rotate and slide in integral fashion, thereby constituting the second primary speed changing device 15.

A synchromesh-form first sub-transmission device 14 is provided between the transmission shaft 4 and first sub-transmission shaft 8, and a synchromesh-form second sub-transmission device 16 is provided between the transmission shaft 4 and second sub-transmission shaft 11, as shown in FIG. 1. A low speed gear 27 and a high speed gear 28 are fixed to the transmission shaft 4, and a low speed gear 29 and high speed gear 30 externally fitted onto the first sub-transmission shaft 8 so as to be able to rotate relative to each other mesh with the low speed gear 27 and high speed gear 28. A shift member 31 is externally fitted onto the first sub-transmission shaft 8 by using a spline structure so that the member and the shaft can rotate and slide in integral fashion, thereby constituting the first sub-transmission device 14. A low speed gear 32 and a high speed gear 33 externally fitted onto the second sub-transmission shaft 11 so as to be able to rotate relative to each other mesh with the low speed gear 27 and high speed gear 28. A shift member 34 is externally fitted onto the second sub-transmission shaft 11 by using a spline structure so that the member and the shaft can rotate and slide in integral fashion, thereby constituting the second sub-transmission device 16.

In accordance with the structure above, a state can be obtained in which the motive force of the transmission shaft 2 is transmitted to the transmission shaft 4 via the first primary and sub-transmission shafts 7 and 8 (the engaged state of the first hydraulic clutch 9), and a state can be obtained in which the motive force of the transmission shaft 2 is transmitted to the transmission shaft 4 via the second primary and sub-transmission shafts 10 and 11 (the engaged state of the second hydraulic clutch 12), as described below.

In a state in which the motive force of the transmission shaft 2 is transmitted to the transmission shaft 4 via the first primary and sub-transmission shafts 7 and 8 (the engaged state of the first hydraulic clutch 9), as shown in FIG. 1, the motive force of the transmission shaft 2 is shifted four steps and transmitted to the transmission shaft 4 by way of the first primary speed changing device 13, first primary transmission shaft 7, first hydraulic clutch 9, first sub-transmission shaft 8, and first sub-transmission device 14 (the first, third, fifth, and seventh speed positions described below).

In a state in which the motive force of the transmission shaft 2 is transmitted to the transmission shaft 4 via the first second primary and sub-transmission shafts 10 and 11 (the engaged state of the second hydraulic clutch 12), as shown in FIG. 1, the motive force of the transmission shaft 2 is shifted four steps and transmitted to the transmission shaft 4 by way of the second primary speed changing device 15, second primary transmission shaft 10, second hydraulic clutch 12, second sub-transmission shaft 11, and second sub-transmission device 16 (the second, fourth, sixth, and eighth speed positions described below).

A third sub-speed changing device 44 is described next.

A transmission shaft 5 is disposed parallel to the transmission shafts 2 and 4, a cylindrical transmission shaft 6 is externally fitted onto the transmission shaft 5 so that the shafts can rotate relative to each other, and a transmission gear 43 fixed to the transmission shaft 6 is meshed with the high speed gear 28, as shown in FIG. 1. The synchromesh-form third sub-speed changing device 44 is provided between the transmission shafts 5 and 6.

A transmission gear 45 is fixed to the transmission shaft 6, a transmission gear 46 is externally fitted onto the transmission shaft 5 so that the gear and the shaft can rotate relative to each other, and a shift member 47 is externally fitted onto the transmission shaft 5 by using a spline structure so that the member and the shaft can rotate and slide in integral fashion, as shown in FIG. 1. Transmission shafts 48 and 49 disposed parallel to the transmission shafts 5 and 6 are provided, transmission gears 50 and 51 are externally fitted onto the transmission shaft 48 so that the gears and the shaft can rotate relative to each other, a transmission gear 52 is fixed to the transmission shaft 48, the transmission gears 45 and 50 mesh with each other, and the transmission gears 46 and 52 mesh with each other. The transmission gears 54 and 55 are fixed to the transmission shaft 49, the transmission gears 51 and 54 mesh with each other, and the shift gear 56 is externally fitted onto the transmission shaft 48 by using a spline structure so that the gear and the shaft can rotate and slide in integral fashion. A sub-speed changing lever (not shown) for slidably operating the shift member 47 and the shift gear 56 is provided, and the driver manually operates the sub-speed changing lever. The third sub-speed changing device 44 is configured in the manner described above.

When the shift member 47 is thereby made to mesh with the transmission shaft 6, the transmission shafts 5 and 6 are engaged, as shown in FIG. 1, and the motive force of the transmission shaft 4 is transmitted to the transmission shaft 5 by way of the high speed gear 28, transmission gear 43, and transmission shaft 6 (the high speed position of the sub-speed changing device 44).

When the shift member 47 is made to mesh with the transmission gear 46 and the shift gear 56 is made to separate from the transmission gear 55 to cause the gear to mesh with the transmission gear 51, the motive force of the transmission shaft 4 is transmitted to the transmission shaft 5 by way of the high speed gear 28, transmission gears 43, 45, and 50, transmission shaft 48, and transmission gears 52 and 46 (the low speed position of the sub-speed changing device 44).

When the shift member 47 is made to mesh with the transmission gear 46 and the shift gear 56 is made to separate from the transmission gear 51 to cause the gear to mesh with the transmission gear 55, the motive force of the transmission shaft 4 is transmitted to the transmission shaft 5 by way of the high speed gear 28, transmission gears 43, 45, 50, and 51, transmission shaft 48, and transmission gears 52 and 46 (the very low speed position of the sub-speed changing device 44).

Described next is a forward/reverse switching apparatus 67, and the transmission system from the forward/reverse switching apparatus 67 (the forward and reverse clutches 75 and 76) to the front wheels 77 and rear wheels 78.

A transmission shaft 66 is coaxially disposed in relation to the transmission shaft 5, as shown in FIG. 1, and a hydraulic clutch-form forward/reverse switching apparatus 67 is provided between the transmission shafts 5 and 66.

A cylindrical transmission shaft 68 is externally fitted onto the transmission shaft 2 so that the shafts can rotate relative to each other, transmission gears 69 and 70 are fixed to the transmission shaft 68, and a transmission gear 71 fixed to the transmission shaft 5 is meshed with the transmission gear 69, as shown in FIG. 1. A transmission shaft 72 is linked to the transmission shaft 66, the transmission shaft 72 is coaxially disposed in relation to the transmission shaft 5, and a transmission gear 73 externally fitted onto the d72 so as to be able to rotate relative to each other is meshed with the transmission gear 70 via an intermediate gear 74. A forward clutch 75, which is a hydraulic frictional multi-disc clutch, is provided between the transmission gear 71 and transmission shaft 72; and a reverse clutch 76, which is a hydraulic frictional multi-disc clutch, is provided between the transmission gear 73 and transmission shaft 72. The forward and reverse clutches 75 and 76 are engaged by being supplied with hydraulic fluid, and are disengaged by discharging the hydraulic fluid. The forward/reverse switching apparatus 67 is configured in the manner described above.

When the forward clutch 75 is engaged and the reverse clutch 76 is disengaged, as shown in FIG. 1, the transmission shafts 5 and 72 are linked, and the motive force of the transmission shaft 5 is transmitted to the transmission shafts 72 and transmission shaft 66 in a forward state by way of the forward clutch 75. When the reverse clutch 76 is engaged and the forward clutch 75 is disengaged, the motive force of the transmission shaft 5 is transmitted to the transmission shafts 72 and 66 in a reverse state by way of the transmission gears 71 and 69, transmission shaft 68, transmission gear 70, intermediate gear 74, transmission gear 73, and reverse clutch 76.

A rear wheel differential mechanism 79 and a planetary reduction mechanism 80 are provided to the transmission shaft 66, and the motive force of the transmission shaft 66 is transmitted to the left and right rear wheels 78 by way of the rear wheel differential mechanism 79 and planetary reduction mechanism 80.

A transmission shaft 81 is disposed parallel to the transmission shaft 66, and a transmission gear 82 fixed to the transmission shaft 66 and a transmission gear 83 fixed to the transmission shaft 81 mesh with each other. A hydraulic clutch-form forward wheels speed changing mechanism 85 is provided between the transmission shaft 81 and a front wheel transmission shaft 84. A forward wheel differential mechanism 86 and planetary reduction mechanism 87 are provided to the front wheel transmission shaft 84. The motive force of the transmission shaft 66 is thereby transmitted to the left and right front wheels 77 by way of the transmission gears 82 and 83, transmission shaft 81, forward wheels speed changing mechanism 85, forward wheels differential mechanism 86, and planetary reduction mechanism 87.

The forward wheels speed changing mechanism 85 is configured so as to be able to be brought to a base state in which the front wheels 77 and rear wheels 78 are driven at the same speed, and to a upshifted state in which the front wheels 77 are driven at a higher speed than the rear wheels 78, as shown in FIG. 1. The forward wheels speed changing mechanism 85 is operated in the base state when the front wheels 77 are steered straight forward in a range of set angles to the left and right of the straight forward position. When the front wheels 77 are steered to the left or right beyond the set angles, the forward wheels speed changing mechanism 85 operates in the upshifted state and small turns are smoothly carried out.

The transmission system to the PTO shaft 3 is described next.

A transmission gear 88 is fixed to the transmission shaft 2, and the motive force of the transmission shaft 2 is transmitted to a hydraulic pump 90 by way the transmission gear 88 and an intermediate gear 89. When the engine 1 is operating, motive force is constantly transmitted to the hydraulic pump 90, and the hydraulic pump 90 is driven, as shown in FIG. 1.

A transmission shaft 91 is coaxially disposed in relation to the transmission shaft 2, and a PTO clutch 92 and PTO speed changing device 93 are provided between the transmission gear 88 and transmission shaft 91, as shown in FIG. 1. The PTO clutch 92 is a hydraulic frictional multi-disc clutch, is engaged by being supplied with hydraulic fluid, and is disengaged by discharging the hydraulic fluid.

A transmission gear 94 is fixed to the PTO clutch 92, a cylindrical transmission shaft 95 is externally fitted onto the transmission shaft 66 so that the shafts can rotate relative to each other, transmission gears 96, 97, and 98 are fixed to the transmission shaft 95, and the transmission gears 94 and 98 mesh with each other. Transmission gears 99 and 100 are externally fitted onto the transmission shaft 91 so that the gears and the shaft can rotate relative to each other, the transmission gears 96 and 99 mesh with each other, the transmission gears 97 and 100 mesh with each other, and shift members 101 and 102 are externally fitted onto the transmission shaft 91 by using a spline structure so that the members and the shaft can rotate and slide in integral fashion. A transmission gear 103 is fixed to the transmission shaft 66, a transmission gear 104 is externally fitted onto the transmission shaft 91 so that the gear and the shaft can rotate relative to each other, and the transmission gears 103 and 104 mesh with each other. The PTO speed changing device 93 is configured in the manner described above.

When the shaft member 101 is thereby made to mesh with the transmission shaft 99, as shown in FIG. 1, the motive force of the PTO clutch 92 is transmitted to the transmission shaft 91 and PTO shaft 3 in a low speed state by way of the transmission gears 94 and 98, the transmission shaft 95, and the transmission gears 96 and 99. When the shift member 102 is made to mesh with the transmission gear 100, the motive force of the PTO clutch 92 is transmitted to the transmission shaft 91 and PTO shaft 3 in an intermediate speed state by way of the transmission gears 94 and 98, transmission shaft 95, and transmission gears 97 and 100. When the shift member 102 is made to mesh with the transmission gear 94, the PTO clutch 92 and transmission shaft 91 are engaged, and the motive force of the transmission shaft 92 is transmitted to the transmission shaft 91 and the PTO shaft 3 in a high speed state. When the shift member 101 is made to mesh with the transmission gear 104, the motive force of the transmission shaft 66 is transmitted to the transmission shaft 91 and PTO shaft 3 by way of the transmission gears 103 and 104.

Described next is the operating structure of the first primary speed changing device 13, first sub-transmission device 14, second primary speed changing device 15, and second sub-transmission device 16.

Figure 2:
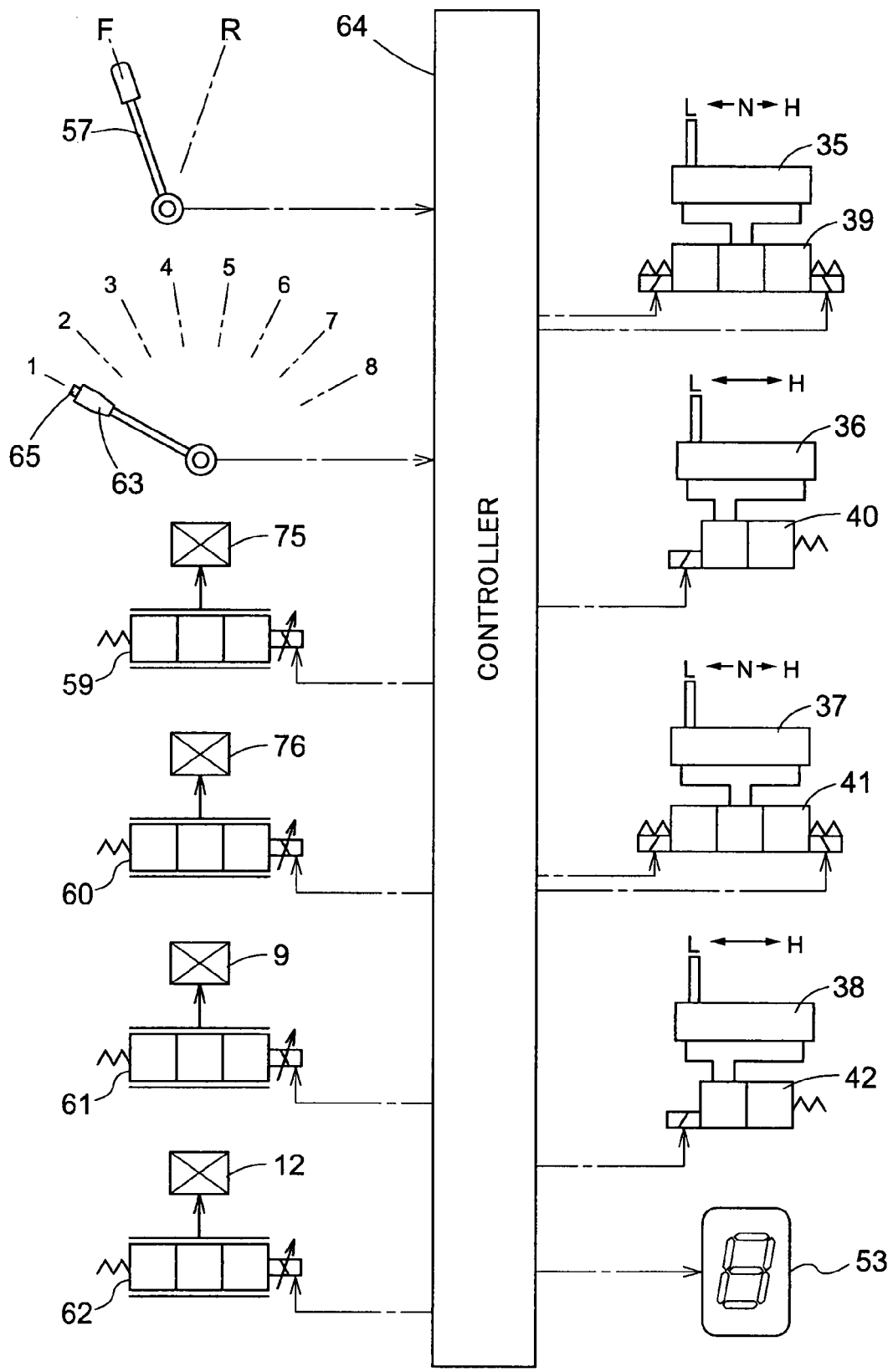
FIG. 2 is a diagram showing a forward/reverse lever, a speed changing lever and operating switch, forward and reverse clutches, first and second hydraulic clutches, and an actuator operating system.

As shown in FIGS. 1 and 2, a double acting hydraulic cylinder-form actuator 35 that slidably operates the shift member 23, and a control valve 39 that controls the supply of hydraulic fluid to the actuator 35 are provided to the first primary speed changing device 13; and a double acting hydraulic cylinder-form actuator 36 that slidably operates the shift member 31, and a control valve 40 that controls the supply of hydraulic fluid to the actuator 36 are provided to the first sub-transmission device 14. The actuator 35 is configured so as to be able to be brought to a low speed position L in which the shift member 23 meshes with the low speed gear 21, to a high speed position H in which the shift member 23 meshes with the high speed gear 22, and to a neutral position N. The actuator 36 is configured so as to be able to be brought to a low speed position L in which the shift member 31 meshes with the low speed gear 29 and to a high speed position H in which the shift member 31 meshes with the high speed gear 30.

As shown in FIGS. 1 and 2, a double acting hydraulic cylinder-form actuator 37 that slidably operates the shift member 26, and a control valve 41 that controls the supply of hydraulic fluid to the actuator 37 are provided to the second primary speed changing device 15; and a double acting hydraulic cylinder-form actuator 38 that slidably operates the shift member 34, and a control valve 42 that controls the supply of hydraulic fluid to the actuator 38 are provided to the second sub-transmission device 16. The actuator 37 is configured so as to be able to be brought to a low speed position L in which the shift member 26 meshes with the low speed gear 24, to a high speed position H in which the shift member 26 meshes with the high speed gear 25, and to a neutral position N. The actuator 38 is configured so as to be able to be brought to a low speed position L in which the shift member 34 meshes with the low speed gear 32 and to a high speed position H in which the shift member 34 meshes with the high speed gear 33.

As shown in FIG. 2, the structure has a magnetic proportional pressure reduction control valve 59 that controls the supply of hydraulic fluid to the forward clutch 75, a magnetic proportional pressure reduction control valve 60 that controls the supply of hydraulic fluid to the reverse clutch 76, a magnetic proportional pressure reduction control valve 61 that controls the supply of hydraulic fluid to the first hydraulic clutch 9, and a magnetic proportional pressure reduction control valve 62 that controls the supply of hydraulic fluid to the second hydraulic clutch 12.

As shown in FIGS. 1 to 8, the above structure provides a state in which the motive force of the transmission shaft 2 is transmitted to the transmission shaft 4 by way of the first primary and sub-transmission shafts 7 and 8 (the engaged state of the first hydraulic clutch 9), wherein the low speed position L of the shift member 23 is the first speed position in the low speed position L of the shift member 31, the high speed position H of the shift member 23 is the third speed position in the low speed position L of the shift member 31, the low speed position L of the shift member 23 is the fifth speed position in the high speed position H of the shift member 31, and the high speed position H of the shift member 23 is the seventh speed position in the high speed position H of the shift member 31. In the first and third speed positions described above, the second hydraulic clutch 12 is disengaged, the shift member 26 is positioned in the neutral position N, and the shift member 34 is positioned in the low speed position L. In the fifth and seventh speed positions, the second hydraulic clutch 12 is disengaged, the shift member 26 is positioned in the neutral position N, and the shift member 34 is positioned in the high speed position H.

As shown in FIGS. 1 to 8, a state in provided in which the motive force of the transmission shaft 2 is transmitted to the transmission shaft 4 by way of the second primary and sub-transmission shafts 10 and 11 (the engaged state of the second hydraulic clutch 12), wherein the low speed position L of the shift member 26 is the second speed position in the low speed position L of the shift member 34, the high speed position H of the shift member 26 is the fourth speed position in the low speed position L of the shift member 34, the low speed position L of the shift member 26 is the sixth speed position in the high speed position H of the shift member 34, and the high speed position H of the shift member 26 is the eighth speed position in the high speed position H of the shift member 34. In the second and fourth speed positions described above, the first hydraulic clutch 9 is disengaged, the shift member 23 is positioned in the neutral position N, and the shift member 31 is positioned in the low speed position L. In the sixth and eighth speed positions, the first hydraulic clutch 9 is disengaged, the shift member 23 is positioned in the neutral position N, and the shift member 31 is positioned in the high speed position H.

A speed changing lever 63 and forward/reverse lever 57 that can be operated in the first to eighth speed positions are provided, as shown in FIG. 2. An operating switch 65 (corresponding to the operating part) is provided to the upper end of the gripping portion of the speed changing lever 63. The operating switch 65 can protrude and retract with respect to the speed changing lever 63 and is urged to the protruding side. The operating positions of the speed changing lever 63, forward/reverse lever 57, and operating switch 65 are inputted to a controller 64 (corresponding to the control means). A seven-segment display unit 53 is provided, and the operating positions of the speed changing lever 63 are displayed in the display unit 53, as are the speed change positions (first to eighth speed positions) of the first primary and first sub-transmission devices 13 and 14 and the second primary and second sub-transmission devices 15 and 16 (see FIG. 8).

The controller 64, as described above, operates the control valves 39 to 42 and 59 to 62 on the basis of the operating positions of the speed changing lever 63 and the forward/reverse lever 57, and on the basis of the operating position of the operating switch 65 (first and second speed changing modes), as shown in FIG. 2. The controller actuates the actuators 35 to 38 and sets the forward and reverse clutches 75 and 76 and the first and second hydraulic clutches 9 and 12 in the transmitting and disengaged states. When the forward/reverse lever 57 is set in the forward position F, the forward clutch 75 is set in the engaged state and the reverse clutch 76 is set in the disengaged state. When the forward/reverse lever 57 is set in the reverse position R, the reverse clutch 76 is set in the engaged state and the forward clutch 75 is set in the disengaged state.

A manually foot-operated clutch pedal (not shown) is provided to the forward and reverse clutches 75 and 76, and the operating positions of the clutch pedal are inputted to the controller 64. In a state in which the forward/reverse lever 57 is set in the forward position F (the forward clutch 75 is set in the engaged state and the reverse clutch 76 is set in the disengaged state), the forward clutch 75 is thereby disengaged when the clutch pedal is pressed and the forward clutch 75 is set in the engaged state when the clutch pedal is released. In a state in which the forward/reverse lever 57 is set in the reverse position R (the reverse clutch 76 is set in the engaged state an the forward clutch 75 is set in the disengaged state), the reverse clutch 76 is disengaged when the clutch pedal is pressed, and the reverse clutch 76 is set in the engaged state when the clutch pedal is released.

In an agricultural tractor, the controller 64 has the first and second speed changing modes, and the driver selects the first and second speed changing modes by using the operating switch 65. The first speed changing mode is selected when the speed changing lever 63 is operated and the operating switch 65 has not been pressed (i.e., in a state in which the operating switch 65 protrudes from the operating lever). The second speed changing mode is selected when the operating switch 65 has been pressed (i.e., in a state in which the operating switch 65 is retracted into the operating lever) and the speed changing lever 63 is operated.

Figure 3:
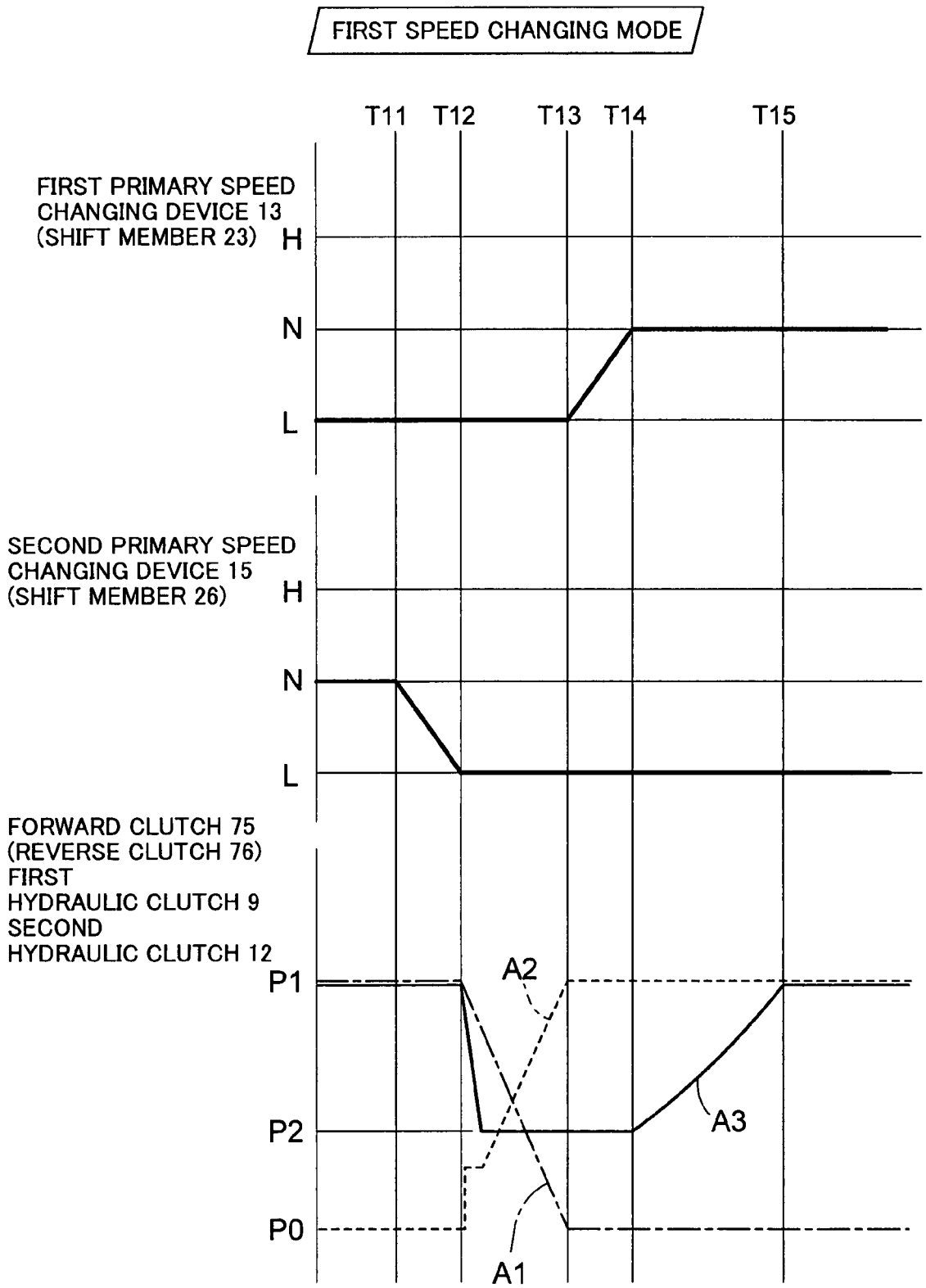
FIG. 3 is a diagram showing the operation from the first speed position to the second speed position in the first speed changing mode.
Figure 5:
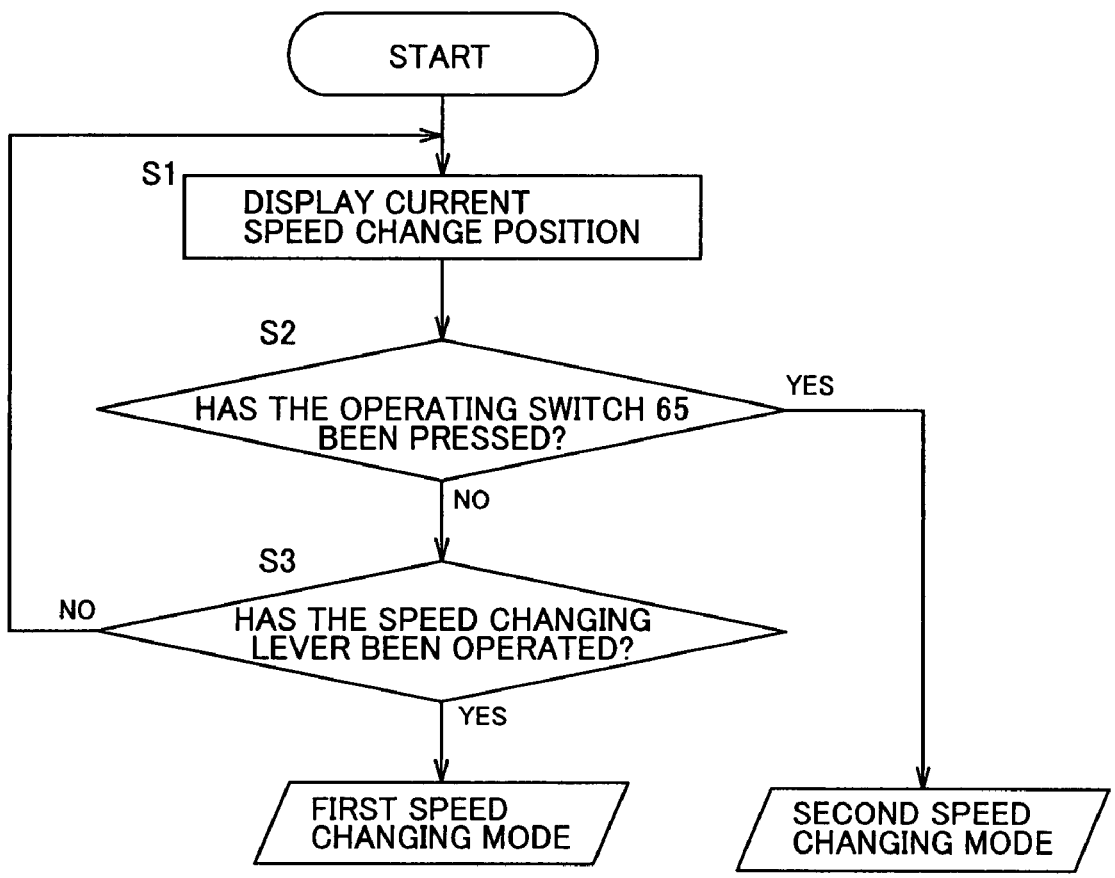
FIG. 5 is a diagram showing the flow of the selection of the first and second speed changing modes.

The first half of the first speed changing mode is described next with reference to FIGS. 3, 5, and 6.

In a state before the speed changing lever 63 and operating switch 65 have been operated, the current speed change positions (first to eight speed positions) of the first primary and sub-speed changing devices 13 and 14, as well as the second primary and sub-speed changing devices 15 and 16, are displayed in the display unit 53 (step S1). In this state, the first speed changing mode is set when the operating switch 65 has not been pressed (step S2) and the speed changing lever 63 is operated (step S3).

As described below, when the speed changing lever 63 is moved from an operating position to another operating position in the first speed changing mode, the first primary and sub-speed changing devices 13 and 14, as well as the second primary and sub-speed changing devices 15 and 16, are operated in single steps from a speed change position (first to eighth speed change positions) that corresponds to the operating position occupied prior to the operation of the speed changing lever 63, so as to follow the operation of the speed changing lever 63, and are operated so as to arrive at a speed change position (first to eighth position) that corresponds to the operating position occupied following the operation of the speed changing lever 63 (the operating position at which the speed changing lever 63 has stopped).

When, for example, the speed changing lever 63 is moved from the first speed position to the fifth speed position, operation is carried out in the first primary and sub-speed changing devices 13 and 14, as well as the second primary and sub-speed changing devices 15 and 16, to shift the gears from the first speed position to the second speed position, from the second speed position to the third speed position, from the third speed position to the fourth speed position, and from the fourth speed position to the fifth speed position. When, for example, the speed changing lever 63 is moved from the sixth speed position to the third speed position, operation is carried out in the first primary and sub-speed changing devices 13 and 14, as well as the second primary and sub-speed changing devices 15 and 16, to shift the gears from the sixth speed position to the fifth speed position, from the fifth speed position to the fourth speed position, and from the fourth speed position to the third speed position.

A state may be established in which the speed changing lever 63 is in the first speed position (the state in which the shift member 23 is in the low speed position L, the shift member 26 is in the neutral position N, the shift members 31 and 34 are in the low speed position L, the forward clutch 75 (reverse clutch 76), and the first hydraulic clutch 9 is engaged at an operating pressure of P1, and the second hydraulic clutch 12 is disengaged at an operating pressure of P0). In this state, the speed changing lever 63 is moved to the high speed side (step S3) and operation is stopped (step S19) at the fifth speed position (the state in which the speed changing lever 63 has stopped at the fifth speed position), and the fifth speed position at which the speed changing lever 63 has stopped is set as the target speed change position (step S20). In this case, when the speed changing lever 63 is moved from the first speed position as described below, the first primary and sub-speed changing devices 13 and 14, as well as the second primary and sub-speed changing devices 15 and 16, are moved so as to follow the operation of the speed changing lever 63.

As described above, the shift member 26 is moved (steps S4 and S5) from the neutral position N to the low speed position L (from time T11 to time T12) when the speed changing lever 63 is moved (step S3) from the state in which the speed changing lever 63 is in the first speed position (time T11). The shift members 23 and 31 are thereby set in the first speed position, and the shift members 26 and 34 are set in the second speed position. In this case, the shift member 34 is not moved to the high speed position H and is left (skip step S6) in the low speed position L (see FIG. 8).

When the shift member 26 is moved (step S5) to the low speed position L (the second speed position state) (time T12), the pressure of the forward clutch 75 (reverse clutch 76) is rapidly reduced to the operating pressure P2 (between the operating positions P0 and P1), and the forward clutch (reverse clutch) is brought (step S7) to a semi-engaged state (time T12) (refer to the solid line A3). At about the same time, the pressure of the second hydraulic clutch 12 is relatively rapidly increased (from time T12 to time T13) from the operating pressure P0, and the second hydraulic clutch is engaged (refer to the dotted line A2). At the same time, the pressure of the first hydraulic clutch 9 is relatively rapidly reduced from the operating pressure P1, and the first hydraulic clutch is disengaged (step S8) (from time T12 to time T13) (refer to the alternate long and short dash line A1).

The result is an overlapping engaged state in which the following two motive forces merge together: the motive force transmitted to the transmission shaft 4 when the shift members 23 and 31 are in the first speed position, and the motive force transmitted to the transmission shaft 4 when the shift members 26 and 34 are in the second speed position, as shown in FIG. 1. Fluctuations in the torque are absorbed because the forward clutch 75 (reverse clutch 76) in a semi-engaged state will slide to a certain extent when fluctuations in the torque are produced in the overlapping engaged state, and a motive force having a low amount of fluctuations in the torque is transmitted to the front wheels 77 and rear wheels 78.

When the second hydraulic clutch 12 is engaged at an operating pressure P1 and the first hydraulic clutch 9 is disengaged at an operating pressure P0 (time T13), the shift member 23 is moved (step S9) to the neutral position N (from time T13 to time T14). In this case, the shift member 31 is not moved to the high speed position H and is left (skip step S10) in the low speed position L (see FIG. 8). When the shift member 23 is moved to the neutral position N (time T14), the pressure of the forward clutch 75 (reverse clutch 76) is progressively increased from the operating pressure P2, and the forward clutch (reverse clutch) is engaged (step S11) when the pressure reaches the operating pressure P1 (from time T14 to time T15). The operation from the first speed position to the second speed position is thus completed and the speed change position (second speed position) of the first primary and sub-speed changing devices 13 and 14, as well as the second primary and sub-speed changing devices 15 and 16, is displayed in the display unit 53 after the operation (step S18).

Figure 6B:
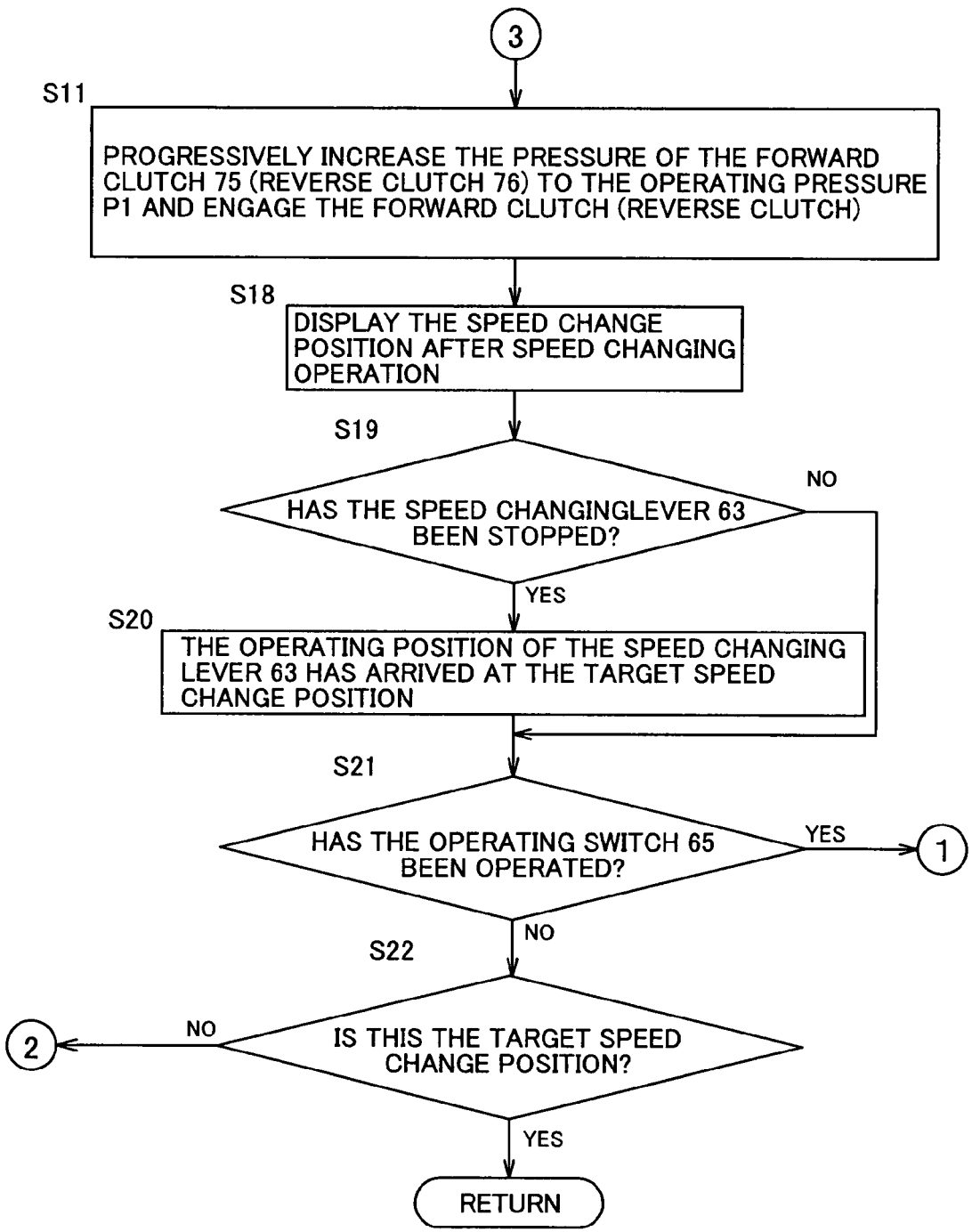

The second half of the first speed changing mode is described next with reference to FIG. 6A and FIG. 6B.

When the operation for changing the speed position from the first speed position to the second speed position as described above, the process moves from steps S22 and S4 to step S12, and the shift members 23 and 31 are moved to the third speed position with the shift members 26 and 34 set in the second speed position (step S12). In this case, the shift member 31 is not moved to the high speed position H and is left (skip step S13) in the low speed position L (see FIG. 8). The pressure of the forward clutch 75 (reverse clutch 76) is rapidly reduced to the operating pressure P2 (between the operating positions P0 and P1), and the forward clutch (reverse clutch) is operated in a semi-engaged state (step S14). At about the same time, the pressure of the first hydraulic clutch 9 is relatively rapidly increased from the operating pressure P0, and the second hydraulic clutch is engaged. At the same time, the pressure of the second hydraulic clutch 12 is relatively rapidly reduced from the operating pressure P1, and the first hydraulic clutch is disengaged (step S15).

The result is an overlapping engaged state in which the following two motive forces merge together: the motive force transmitted to the transmission shaft 4 when the shift members 26 and 34 are in the second speed position, and the motive force transmitted to the transmission shaft 4 when the shift members 23 and 31 are in the third speed position, as shown in FIG. 1. Fluctuations in the torque are absorbed because the forward clutch 75 (reverse clutch 76) in a semi-engaged state will slide to a certain extent when fluctuations in the torque are produced in the overlapping engaged state, and a motive force having a low amount of fluctuations in the torque is transmitted to the front wheels 77 and rear wheels 78.

When the first hydraulic clutch 9 is engaged at an operating pressure P1 and the second hydraulic clutch 12 is disengaged at an operating pressure P0, the shift member 26 is moved (step S16) to the neutral position N. In this case, the shift member 34 is not moved to the high speed position H and is left (skip step S17) in the low speed position L (see FIG. 8). When the shift member 26 is moved to the neutral position N, the pressure of the forward clutch 75 (reverse clutch 76) is progressively increased from the operating pressure P2, and the forward clutch (reverse clutch) is engaged (step S1) when the pressure reaches the operating pressure P1.

The operation from the second speed position to the third speed position is thus completed and the speed change position (third speed position) of the first primary and sub-speed changing devices 13 and 14, as well as the second primary and sub-speed changing devices 15 and 16, is displayed in the display unit 53 after the operation (step S18).

When the operation from the second speed position to the third speed position is completed, the operation from the third speed position to the fourth speed position, wherein the shift members 23 and 31 are in the third speed position and the shift members 26 and 34 are in the fourth speed position, is subsequently carried out on the basis of the preceding section [6] and steps S4 to S11 (in this case, the shift members 34 and 31 are not moved to the high speed position H and are left (skip steps S6 and S10) in the low speed position L (see FIG. 8)).

The operation from the fourth speed position to the fifth speed position, wherein the shift members 26 and 34 are in the fourth speed position and the shift members 23 and 31 are in the fifth speed position, is subsequently carried out on the basis of the this section and step S4, steps S12 to S17, and step S11 (in this case, the shift member 31 is moved from the low speed position L to the high speed position H in step S13, and the shift member 34 is moved from the low speed position L to the high speed position H in step S17) (see FIG. 8).

The single step operations and the display of the speed change position of the first primary and sub-speed changing devices 13 and 14, as well as the second primary and sub-speed changing devices 15 and 16, are thus repeated, and the operation ends when the speed change position is at the target speed change position (fifth speed position) at which the speed changing lever 63 has stopped (step S22.

Figure 4:
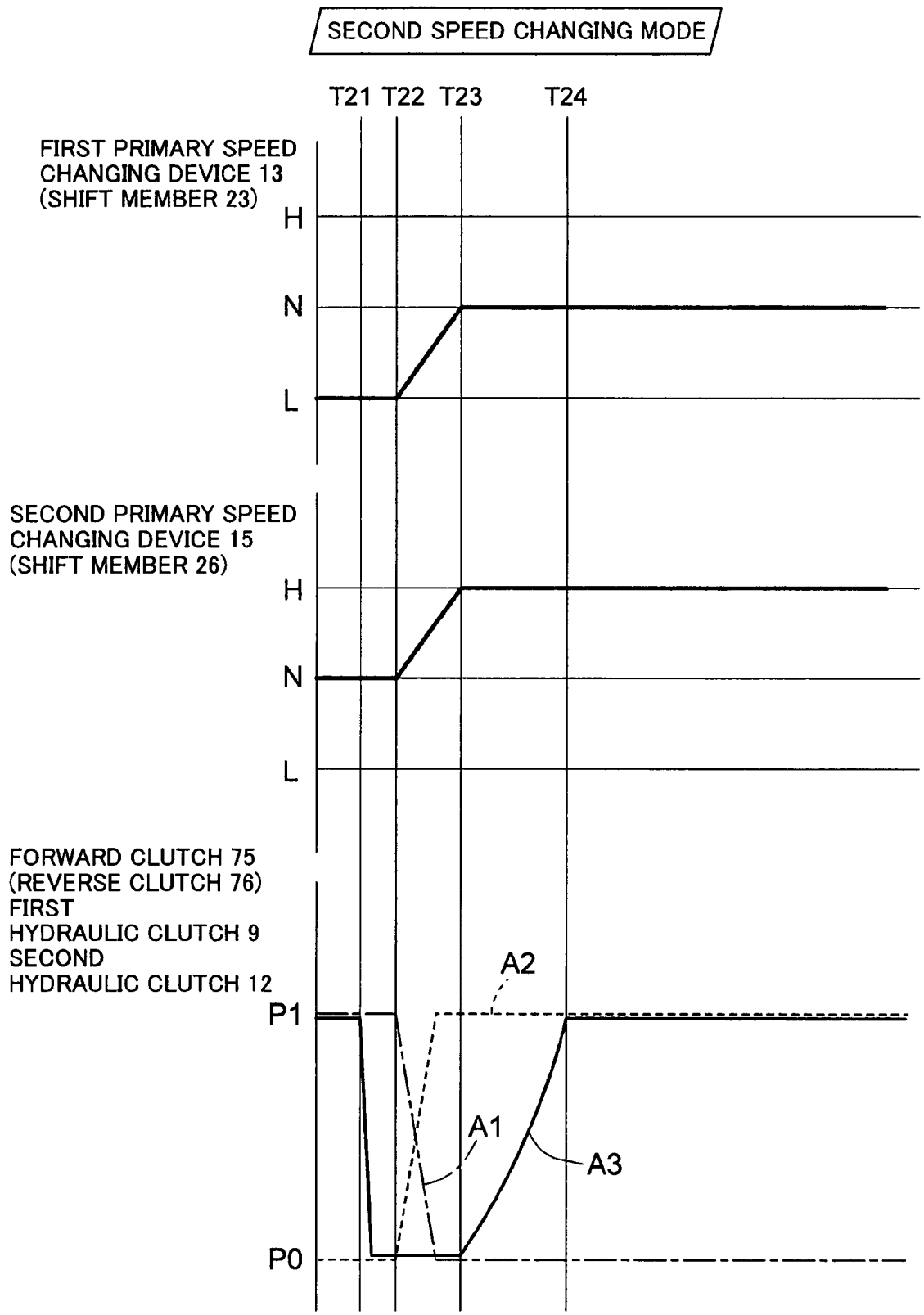
FIG. 4 is a diagram showing the operation from the first speed position to the fourth speed position in the second speed changing mode.

The second speed changing mode is described next with reference to FIGS. 4, 5, and 7.

In the state prior to the operation of the speed changing lever 63 and operating switch 65, the current speed change positions (first to eighth speed positions) of the first primary and sub-speed changing devices 13 and 14, as well as the second primary and sub-speed changing devices 15 and 16, are displayed in the display unit 53 (step S1). When the operating switch 65 is pressed in this state (step S2), the second speed changing mode is set.

In the second speed changing mode, as described below, when the speed changing lever 63 is moved from an operating position to another operating position, the first primary and sub-speed changing devices 13 and 14, as well as the second primary and sub-speed changing devices 15 and 16, are operated in a single process from a speed change position (first to eighth speed change positions) that corresponds to the operating position occupied prior to the operation of the speed changing lever 63, to the speed change position (first to eighth position) that corresponds to an operating position occupied following the operation of the speed changing lever 63 (the operating position at which the speed changing lever 63 has stopped), without passing through the intermediate speed change positions (e.g., when the operating switch 65 is pressed and the speed changing lever 63 is moved from the first speed position to the fourth speed position, the first primary and sub-speed changing devices 13 and 14, as well as the second primary and sub-speed changing devices 15 and 16, are moved in a single process from the first speed position to the fourth speed position).

A state may be established in which the speed changing lever 63 is in the first speed position (the state in which the shift member 23 is in the low speed position L, the shift member 26 is in the neutral position N, the shift members 31 and 34 are in the low speed position L, the forward clutch 75 (reverse clutch 76) and the first hydraulic clutch 9 are engaged at an operating pressure of P1, and the second hydraulic clutch 12 is disengaged at an operating pressure of P0). In this state, the operating switch 65 is pressed/operated (the operating switch 65 is pressed and then released) (step S2), and the second speed changing mode is selected.

The pressure of the forward clutch 75 (reverse clutch 76) is thereby rapidly reduced to the operating pressure P0 to disengage the clutch (step S31) (time T21) (refer to the solid line A3), the current operating position of the speed changing lever 63 is displayed by the display unit 53 as the speed changing lever 63 is moved from the first speed position (steps S32 and S33), and the operating position at which the speed changing lever 63 has stopped (the state in which the speed changing lever 63 has stopped) is set as the target speed change position (step S34). Since the operating position at which the speed changing lever 63 has stopped is displayed by the display unit 53, the target speed change position can be confirmed by viewing the display unit 53.

When the target speed change position is set in the manner described above (step S34), the first primary and sub-speed changing devices 13 and 14 (shift members 23 and 31), as well as the second primary and sub-speed changing devices 15 and 16 (shift members 26 and 34), are moved (step S35) in a single process to the target speed change position (see FIG. 8), and the first and second hydraulic clutches 9 and 12 are engaged or disengaged (step S36) so as to correspond to the target speed change position (see FIG. 8).

When the speed changing lever 63 is moved from the first speed position to the fourth speed position and the fourth speed position is set as the target speed change position (step S34), the shift member 23 is moved from the low speed position L to the neutral position N, and the shift member 26 is moved from the neutral position N to the high speed position H (from time T22 to time T23) (the shift members 31 and 34 are held in the low speed position L). At the same time, the pressure of the first hydraulic clutch 9 is relatively rapidly reduced to the operating pressure P0 to disengage the first hydraulic clutch (time T22) (refer to the dotted line A1), and the pressure of the second hydraulic clutch 12 is relatively rapidly increased to the operating pressure P1 to engage the second hydraulic clutch (time T22) (refer to the dotted line A2).

The pressure of the forward clutch 75 (reverse clutch 76) is progressively increased from the operating pressure P0 to reach the operating pressure P1 (refer to solid line A3), and the forward clutch 75 (reverse clutch 76) is engaged (step S37) (time T24) (refer to the solid line A3). The operation is thus completed.

When the speed changing lever 63 is moved from, e.g., the second speed position to the first speed position, the shift members 23 and 26 (the shift members 31 and 34 are held in the low speed position L) are moved in the manner shown in FIG. 8. The states of the first and second hydraulic clutches 9 and 12 are reversed in FIG. 4, the first hydraulic clutch 9 is switched from a disengaged state to an engaged state, the second hydraulic clutch 12 is switched from an engaged state to a disengaged state and the pressure of the forward clutch 75 (reverse clutch 76) is increased in the manner indicated by the solid line A3 in FIG. 4.

When the speed changing lever 63 is moved from, e.g., the first speed position to the third speed position, the shift member 23 is operated in the manner shown in FIG. 8. The shift member 26 remains in the neutral position N (the shift members 31 and 34 are held in the low speed position L), the first hydraulic clutch 9 is kept engaged, the second hydraulic clutch 12 is kept disengaged, and the pressure of the forward clutch 75 (reverse clutch 76) is increased and reduced in the manner indicated by the solid line A3 in FIG. 4.

When the speed changing lever 63 is moved from, e.g., the second speed position to the fourth speed position, the shift member 26 is operated in the manner shown in FIG. 8. The shift member 23 remains in the neutral position N (the shift members 31 and 34 are held in the low speed position L), the first hydraulic clutch 9 is kept disengaged, the second hydraulic clutch 12 is kept engaged, and the pressure of the forward clutch 75 (reverse clutch 76) is increased and reduced in the manner indicated by the solid line A3 in FIG. 4.

In the first speed changing mode described in the preceding sections, the speed changing lever 63 is moved from an operating position to another operating position, and the first primary and sub-speed changing devices 13 and 14, as well as the second primary and sub-speed changing devices 15 and 16, are operated in single steps (steps S4 to S22 of FIG. 6) so as to follow the operation of the speed changing lever 63 (so as to shift toward the target speed change position at which the speed changing lever 63 has stopped). When the operating switch 65 is pressed in this state (step S21), the process advances to step S34 and the first primary and sub-speed changing devices 13 and 14 (shift members 23 and 31), as well as the second primary and sub-speed changing devices 15 and 16 (shift members 26 and 34), are moved in a single process to the target speed change position (steps S35 to S37).

First Alternative Embodiment

In the configuration described above, step S31 of FIG. 7 may be provided between the steps S34 and S35 of FIG. 7 in the second speed changing mode.

When configured in this manner, the forward clutch 75 (reverse clutch 76) is not immediately disengaged even if the operating switch 65 is pressed/operated (the operating switch 65 is pressed and then released) and the second speed changing mode is set. Rather, the speed changing lever 63 is operated thereafter, and when the speed changing lever 63 is stopped and the target speed change position is set, the pressure of the forward clutch 75 (reverse clutch 76) is rapidly reduced to the operating pressure P0, the forward clutch (reverse clutch) is disengaged, and the process advances to steps S35 to S37. The time in which the forward clutch 75 (reverse clutch 76) is disengaged (the time that motive force is not transmitted to the front wheels 77 and rear wheels 78) can be made less than that described in the Description of the Preferred Embodiments.

Second Alternative Embodiment

In the configuration described above, the first primary speed changing device 13 shown in FIG. 1 may be disposed between the first sub-transmission shaft 8 and the transmission shaft 4, and the first sub-transmission device 14 may be disposed between the first primary transmission shaft 7 and the transmission shaft 2. The second primary speed changing device 15 shown in FIG. 1 may be disposed between the second sub-transmission shaft 11 and the transmission shaft 4, and the second sub-transmission device 16 may be disposed between the second primary transmission shaft 10 and the transmission shaft 2.

The present invention may be applied to work vehicles provided with a hydraulic clutch-form travel speed changing device such as described the Patent Document 1, and may be applied to a work vehicle provided with right and left crawler travel apparatuses (not shown) in place of the front wheels 77 and rear wheels 78.

What is claimed is:

1. A speed changing structure for a work vehicle, comprising:

a travel speed changing device (13, 14, 15, 16) having a plurality of speed change positions;
a manually operated speed changing lever (63);
a controller (64) for controlling the travel speed changing device;
a manually operable operating part (65) provided on the speed changing lever (63); and
a display unit (53) for displaying the current operating position of the speed changing lever (63),
wherein the speed changing lever (63) has a plurality of operating positions corresponding, respectively, to the speed change positions of the travel speed changing device (13, 14, 15, 16);
wherein the controller (64) operates the travel speed changing device (13, 14, 15, 16) in a first speed changing mode when the speed changing lever (63) is operated and the operating part (65) is not operated, and operates the travel speed changing device (13, 14, 15, 16) in a second speed changing mode when the speed changing lever (63) and the operating part (65) are operated; and
wherein in the first speed changing mode the travel speed changing device is operable such that the speed change positions correspond sequentially to operating positions of the speed changing lever (63), and in the second speed changing mode the travel speed changing device is operable to skip intermediate operating positions that the speed changing lever (63) passes through from a current operating position to a target operating position, and the target operating position at which the speed changing lever (63) is stopped in the second speed changing mode is set as a target speed change position and displayed on the display unit (53).

2. The speed changing structure of claim 1, wherein:
the operating part (65) is protrudably and retractably disposed in the speed changing lever (63) and is urged toward the protruding side; and
the controller (64) operates the travel speed changing device (13, 14, 15, 16) in the first speed changing mode when the speed changing lever (63) is operated in a state in which the operating part (65) is protruding, and operates the travel speed changing device (13, 14, 15, 16) in the second speed changing mode when the speed changing lever is operated in a state in which the operating part (65) has been retracted.

3. The speed changing structure of claim 1, wherein the operating part (65) is disposed on an upper end of a gripping part of the speed changing lever (63).

4. A speed changing structure for a work vehicle, comprising:
a travel speed changing device (13, 14, 15, 16) having a plurality of speed change positions;
a manually operated speed changing lever (63);
a controller (64) for controlling the travel speed changing device (13, 14, 15, 16);
a manually operable operating part (65) provided on the speed changing lever (63); and
a hydraulic clutch-form forward/reverse switching apparatus (67) comprising forward and reverse hydraulic clutches (75, 76) to transmit forward or reverse drive to the front wheels and rear wheels (77, 78) of the work vehicle,
wherein the speed changing lever (63) has a plurality of operating positions corresponding, respectively, to the speed change positions of the travel speed changing device (13, 14, 15, 16);
wherein the controller (64) operates the travel speed changing device (13, 14, 15, 16) in a first speed changing mode when the speed changing lever (63) is operated and the operating part (65) is not operated, and operates the travel speed changing device (13, 14, 15, 16) in a second speed changing mode when the speed changing lever (63) and the operating part (65) are operated;
wherein in the first speed changing mode the travel speed changing device is operable such that the speed change positions correspond sequentially to operating positions of the speed changing lever (63), and in the second speed changing mode the travel speed changing device is operable to skip intermediate operating positions that the speed changing lever (63) passes through from a current operating position to a target operating position, and the target operating position at which the speed changing lever (63) is stopped in the second speed changing mode is set as a target speed change position; and
wherein in the second speed changing mode, hydraulic pressure to the forward or reverse clutches (75, 76) is progressively changed from an operating pressure corresponding to a disengaged state of the forward or reverse clutches (75, 76) to an operating pressure corresponding to the target speed change position of the travel speed changing device.

5. The speed changing structure of claim 4, wherein the travel speed changing device (13, 14, 15, 16) further comprises:
a first primary speed changing device (13);
a first sub-transmission device (14);
a second primary speed changing device (15);
a second sub-transmission device (16);
a first hydraulic clutch (9) operatively connecting the first primary speed changing device (13) and the first sub-transmission device (14); and
a second hydraulic clutch (12) operatively connecting the second primary speed changing device (15) and the second sub-transmission device (16); and
wherein in the second speed changing mode, hydraulic pressure to one of the first hydraulic clutch (9) and the second hydraulic clutch (12) is rapidly reduced to an operating pressure corresponding to a disengaged state of the first and second hydraulic clutches (9, 12) while hydraulic pressure to the other of the first hydraulic clutch (9) and the second hydraulic clutch (12) is rapidly increased to the operating pressure corresponding to the target speed change position of the travel speed changing device.

6. The speed changing structure of claim 4, wherein:
the operating part (65) is protrudably and retractably disposed in the speed changing lever (63) and is urged toward the protruding side; and
the controller (64) operates the travel speed changing device (13, 14, 15, 16) in the first speed changing mode when the speed changing lever (63) is operated in a state in which the operating part (65) is protruding, and operates the travel speed changing device (13, 14, 15, 16) in the second speed changing mode when the speed changing lever is operated in a state in which the operating part (65) has been retracted.

7. The speed changing structure of claim 4, wherein the operating part (65) is disposed on an upper end of a gripping part of the speed changing lever (63).

* * * * *